Patented Feb. 27, 1923.

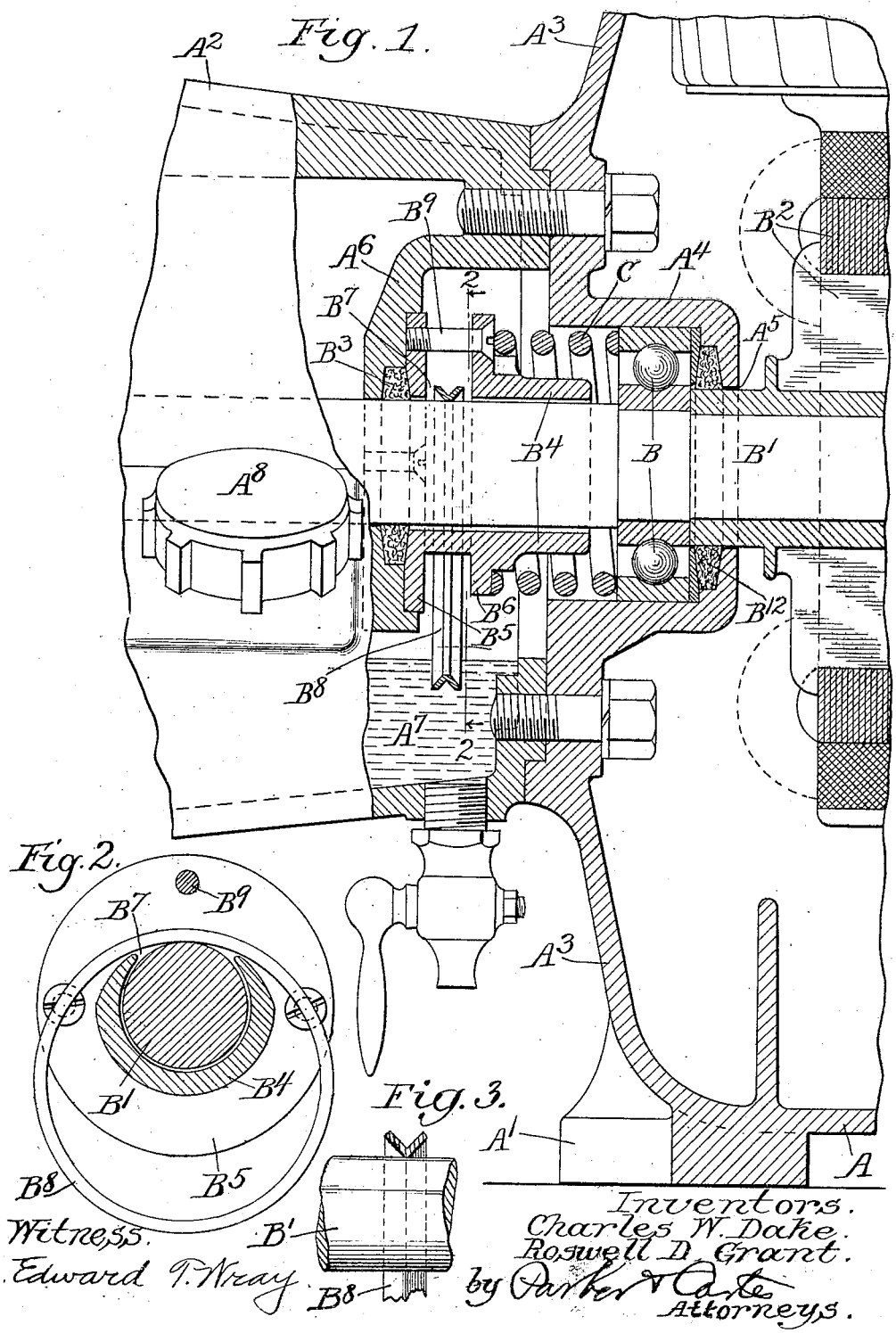

1,446,786

UNITED STATES PATENT OFFICE.

CHARLES W. DAKE AND ROSWELL D. GRANT, OF CHICAGO, ILLINOIS, ASSIGNORS TO PYLE-NATIONAL COMPANY, A CORPORATION OF ILLINOIS.

OILING DEVICE FOR STEAM TURBINES.

Application filed February 1, 1919. Serial No. 274,553.

*To all whom it may concern:*

Be it known that we, CHARLES W. DAKE and ROSWELL D. GRANT, citizens of the United States, residing at Chicago, in the county of Cook and State of Illinois, have invented a certain new and useful Improvement in Oiling Devices for Steam Turbines, of which the following is a specification.

Our invention relates generally to improvements in oiling devices for oiling the bearings in such a motor generator set as may be used in connection with a steam turbine and electric generator, a production of electric power in any suitable condition, or for any suitable purpose, but preferably for locomotive electric lighting equipment.

In such structures there is ordinarily a shaft with a turbine wheel near one end and a generator at the other end. There is ordinarily one bearing at the out board end of the shaft beyond the turbine wheel and another bearing between the turbine wheel and the generator, as near to the generator as possible. These two bearings are the only ones and the bearing at the generator end being more or less enclosed within the housing connecting the motor and generator assemblies is comparatively hard to get at and likely to give trouble, therefore, special care must be taken to provide a bearing device which will be exceedingly simple, permanent and reliable in its operation and which can be easily assembled and disassembled when the machine is constructed or taken down.

It is also desirable to provide a bearing arrangement which will be at all times well lubricated, but it is equally important that the device shall not spill any lubrication over into the electrical part of the machinery, as thus short circuiting would be inevitable.

Our invention is therefore more or less diagrammatically shown in the accompanying drawings wherein Figure 1 is a longitudinal section;

Figure 2 is a section along the line 2—2 of Figure 1;

Figure 3 is a section through modified form of oil ring.

Like parts are indicated by like characters in all the figures.

A is a generator housing mounted upon a foot $A^1$. $A^2$ is a turbine housing secured to the generator housing as indicated. The wall of the generator housing $A^3$ is continuous as indicated except for the recess or socket $A^4$ inwardly extending and apertured at $A^5$, the end wall of the turbine housing is inwardly extended as at $A^6$ to provide a cover for the socket, and the housing at its lowest side, contains an oil well $A^7$ adapted to be filled from the outside by any suitable oil through a filler cap $A^8$.

This socket and cover provide a housing for the ball bearing B which carries the shaft $B^1$. Upon this shaft is mounted at one end a suitable turbine wheel not here shown, at the other end a suitable armature $B^2$ here indicated in part only. $B^{12}$ is a packing interposed between the out board end of the ball bearing and the end wall of the socket adapted to surround the shaft and prevent leakage of oil from the bearing housing into the interior of the electrical generator housing. $B^3$ is a packing surrounding the shaft and interposed between it and the cover. $B^4$ is a sleeve flanged as at $B^5$ to engage the end wall of the cover, and also to engage the packing $B^3$. This sleeve surrounds but is out of contact with the shaft. It is also flanged as at $B^6$ and slotted at $B^7$ between the two flanges. $B^8$ is an oiling ring riding upon the shaft $B^1$ located within the slot $B^7$ and held from bouncing out of that slot by the screw $B^9$ which will be screwed in after the assembly has taken place.

C is a spiral coiled spring surrounding the shaft and sleeve and engaging at one end against the fixed portion of the ball bearing and at the other end against the flange $B^6$, whereby the ball bearing is firmly and powerfully seated within the housing while still free to move slightly and protected against binding by the spring seating.

It will be evident that while we have shown in our drawings an operative device, still many changes might be made both in size, shape and arrangement of parts without departing materially from the spirit of our invention and we wish therefore that our drawings be regarded as in a sense diagrammatic.

Clearly the particular form of sleeve or bushing might be used for other purposes and in other connections and with or without the preferred form of oil ring.

One form of oil ring which we have shown in Figure 3 is made by cutting a section from a thin brass tube and upsetting it so as to form a light stiff ring of V shape, cross section as indicated making a narrow contact with the shaft and with its two sides inclined outwardly from the shaft so as to afford the largest possible oil pocket, arranged between the ring and the shaft thus giving a light ring which does not wear the shaft but which has large oil capacity.

The use and operation of our invention are as follows:—

The apparatus is preferably assembled with the ball bearing in place in its socket with packing ring between the ball bearing and the wall of the socket adjacent the aperture through which the shaft will pass, the slotted sleeve is put in place at the other side of the housing with a similar packing ring in position. The oil ring is put into the slot on the sleeve and the screw or other limiting means placed to prevent displacement of the oiling ring. The coil spring is then placed about the sleeve, the shaft is inserted through the housing and sleeve and spring and ball bearing with the ring resting on shaft and hanging down into the oil well. The two parts of the housing are then fastened together by cap screws, as shown, thus compressing the spring and yieldingly holding the ball bearing assembly or ring on its seat and also bringing pressure to bear upon the oil packing to prevent leakage of oil out of the housing.

The oil well will then be filled and the apparatus is then ready for operation.

The order of assembly of the different parts might obviously be different. The method we have above disclosed is a sufficient and suitable one because it makes it possible to assemble the ball bearing, shaft and associated parts in a housing which will permit full and complete, automatic and permanent lubrication of the main shaft bearing without possible leakage of oil into the electrical system.

We claim:—

1. The combination with a shaft and ball bearing therefor of a closed housing enclosing them, an oil well removed from the bearing and means for raising oil therefrom and discharging it upon the shaft, and a sleeve surrounding but out of contact with the shaft arranged to conduct such oil toward the ball bearing, said sleeve terminating adjacent the ball bearing.

2. The combination with a shaft and ball bearing therefor of a closed housing enclosing them, an oil well removed from the bearing and means for raising oil therefrom and discharging it upon the shaft, and a sleeve surrounding but out of contact with the shaft arranged to conduct such oil toward the ball bearing, said sleeve being slotted in line with the oil raising means.

3. The combination with a shaft and ball bearing therefor of a closed housing enclosing them, an oil well removed from the bearing, an oil ring supported on the shaft, a sleeve surrounding but out of contact with the shaft and slotted to permit free operation of the oil ring.

4. The combination with a shaft and ball bearing therefor of a closing housing enclosing them, an oil well removed from the bearing, an oil ring supported on the shaft, a sleeve surrounding but out of contact with the shaft, and slotted to permit free operation of the oil ring, said sleeve terminating adjacent the ball bearing.

5. The combination with a shaft and ball bearing of a combined oil well and apertured housing therefor, a slotted sleeve surrounding but out of contact with the shaft, within the housing, terminating adjacent the ball bearing, an oil ring in the well and engaging the shaft through the slot.

6. The combination with a shaft and ball bearing of a combined oil well and apertured housing therefor, a slotted sleeve surrounding but out of contact with the shaft, within the housing, terminating adjacent the ball bearing, an oil ring in the well and engaging the shaft through the slot, and means for yieldingly holding both the ball bearing and the sleeve in proper relative position within the housing.

7. The combination with a shaft and ball bearing of a combined oil well and apertured housing therefor, a slotted sleeve surrounding but out of contact with the shaft, within the housing, terminating adjacent the ball bearing, an oil ring in the well and engaging the shaft through the slot, and means for yieldingly holding both the ball bearing and the sleeve in proper relative position within the housing, bearing rings between the wall of the housing and the sleeve and the ball bearing, said yielding means being arranged to exert pressure upon the packing rings to prevent oil leakage from the housing.

8. The combination with a shaft and ball bearing therefor of a closed housing enclosing them, the ball bearing being slidably mounted therein yielding means for resisting the movement of the ball bearing, the yielding means directly engaging one side of the ball bearing and a packing for the bearing housing directly engaging the other side of the ball bearing and lubricating means adjacent said yielding means.

9. An oil ring of V shape cross section of substantially the same thickness throughout, the apex of the V being adapted to engage the shaft to be oiled.

10. An oil ring of V shape cross section of substantially the same thickness throughout the apex of the V being flattened where it engages the shaft.

11. An oiling sleeve for bearings and the like having 2 separate parallel flanges, a portion of the sleeve adjacent and between the flanges being cut away to expose the shaft therein contained.

12. An oiling sleeve for bearings and the like having 2 separate parallel flanges, a portion of the sleeve between the flanges being cut away to expose the shaft therein contained, means carried by said flanges adjacent to the cutaway portion of the sleeve for preventing displacement of an oiling ring.

13. The combination with shaft of a sleeve surrounding, but out of contact with it, two parallel spaced flanges on the sleeve, the sleeve being cut away between the flanges for a portion of its periphery.

14. The combination with shaft of a sleeve surrounding, but out of contact with it, two parallel spaced flanges on the sleeve, the sleeve being cutaway between the flanges for a portion of its periphery, an oil ring contained between the flanges and means carried by them for preventing displacement of the ring.

15. An oiling sleeve having a plurality of separate spaced flanges, the sleeve adjacent and between the flanges being entirely cut away for a portion of its periphery.

16. The combination of a shaft and a ball bearing therefor, of an oiling sleeve surrounding, but out of contact with said shaft, said sleeve having a plurality of separate spaced flanges, the sleeve between the flanges being entirely cut away for a portion of its periphery, the edges of the cut away portion being bevelled.

17. The combination with a shaft and a ball bearing therefor, and a closed housing enclosing them, of means for lubricating the bearing comprising an oiling sleeve and an oiling ring associated therewith, and means for permitting longitudinal displacement of the bearing under operating conditions in yielding contact with said oiling sleeve.

18. The combination with a shaft and a ball bearing therefor, and a closed housing enclosing them, of means for lubricating the bearing, comprising an oiling sleeve and an oiling ring associated therewith, and means for permitting longitudinal displacement of the bearing under operating conditions comprising a yielding member supported by said sleeve and adapted to be compressed between it and the ball bearing.

19. The combination with a shaft and ball bearing therefor of a sleeve surrounding but out of contact with the shaft and a slot therein, an oiling ring rotating within said slot and engaging the shaft and means for preventing displacement of the oiling ring, the sleeve being arranged to discharge the oil raised by the oiling ring into the immediate vicinity of the ball bearing.

20. An oiling ring for shafts and the like, having a relatively narrow central portion adapted to engage the shaft, the inner surface of the ring on both sides of the shaft-engaging portion being flared outwardly away from the shaft.

In witness whereof, we affix our signatures in the presence of two witnesses this 27th day of January, 1919.

CHARLES W. DAKE.
ROSWELL D. GRANT.

Witnesses:
EDNA B. PETERSON,
MARION L. INGRAHAM.